US008920238B2

(12) United States Patent
Chun

(10) Patent No.: US 8,920,238 B2
(45) Date of Patent: *Dec. 30, 2014

(54) GAMING CENTER ALLOWING SWITCHING BETWEEN GAMES BASED UPON HISTORICAL RESULTS

(71) Applicant: Jay Chun, Hong Kong (CN)

(72) Inventor: Jay Chun, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,991

(22) Filed: Nov. 1, 2012

(65) Prior Publication Data

US 2013/0165235 A1 Jun. 27, 2013

Related U.S. Application Data

(63) Continuation-in-part of application No. 11/897,590, filed on Aug. 31, 2007, now Pat. No. 8,323,105, which is a continuation-in-part of application No. 11/800,885, filed on May 7, 2007, now Pat. No. 8,308,559, application No. 13/665,991, which is a continuation-in-part of application No. 13/042,633, filed on Mar. 8, 2011, which is a continuation of application No. 11/497,708, filed on Aug. 1, 2006, now Pat. No. 7,922,587, which is a continuation-in-part of application No. 11/312,150, filed on Dec. 19, 2005, now Pat. No. 7,914,368, and a continuation-in-part of application No. 11/198,218, filed on Aug. 5, 2005, and a continuation-in-part of application No. 11/042,732, filed on Jan. 24, 2005, now Pat. No. 7,918,723.

(51) Int. Cl.
*A63F 13/00* (2014.01)

(52) U.S. Cl.
USPC ............................................... 463/31; 463/25

(58) Field of Classification Search
CPC . G07F 17/32; G07F 17/3262; G07F 17/3211; A63F 2001/001; A63F 3/00157
USPC ......................................... 463/40–42, 16–25
See application file for complete search history.

(56) References Cited

U.S. PATENT DOCUMENTS

| | | | | |
|---|---|---|---|---|
| 7,008,319 | B2 * | 3/2006 | Montgomery et al. | 463/21 |
| 7,309,065 | B2 * | 12/2007 | Yoseloff et al. | 273/292 |
| 2004/0087357 | A1 * | 5/2004 | Johnson | 463/17 |
| 2004/0116179 | A1 * | 6/2004 | Nicely et al. | 463/25 |
| 2004/0235542 | A1 * | 11/2004 | Stronach et al. | 463/6 |
| 2006/0166731 | A1 * | 7/2006 | Yoshimi et al. | 463/20 |
| 2006/0287058 | A1 * | 12/2006 | Resnick et al. | 463/19 |
| 2007/0135204 | A1 * | 6/2007 | Nicely | 463/17 |

(Continued)

*Primary Examiner* — Masud Ahmed

(74) *Attorney, Agent, or Firm* — Jennifer Meredith, Esq.; Meredith & Keyhani, PLLC

(57) ABSTRACT

A gaming system comprising a main cabinet and a computer server, comprising: a mechanism in a main cabinet for selecting and playing, by a player, one or more live casino game(s) from a plurality of live casino games being played at a plurality of tables spaced away from said main cabinet; a mechanism for selecting and playing one or more casino slot machine game(s) by the player, at least one first portion of a first screen in the main cabinet for displaying the live-casino game(s), wherein a results history for each table is displayed to provide a results history display, a second additional portion of a screen in main cabinet for displaying at least one casino slot game(s), the mechanism playing the casino slot machine game(s) is adapted to allow the player to switch between the live casino games and at least one casino slot machine games according to at least the results history display for each table.

17 Claims, 15 Drawing Sheets

(56) References Cited

U.S. PATENT DOCUMENTS

2007/0155512 A1* 7/2007 Wells et al. .................... 463/46
2008/0045288 A1* 2/2008 Moshal et al. .................. 463/16
2008/0085769 A1* 4/2008 Lutnick et al. .................. 463/41
2008/0254881 A1* 10/2008 Lutnick et al. .................. 463/31

* cited by examiner

FIGURE 13A
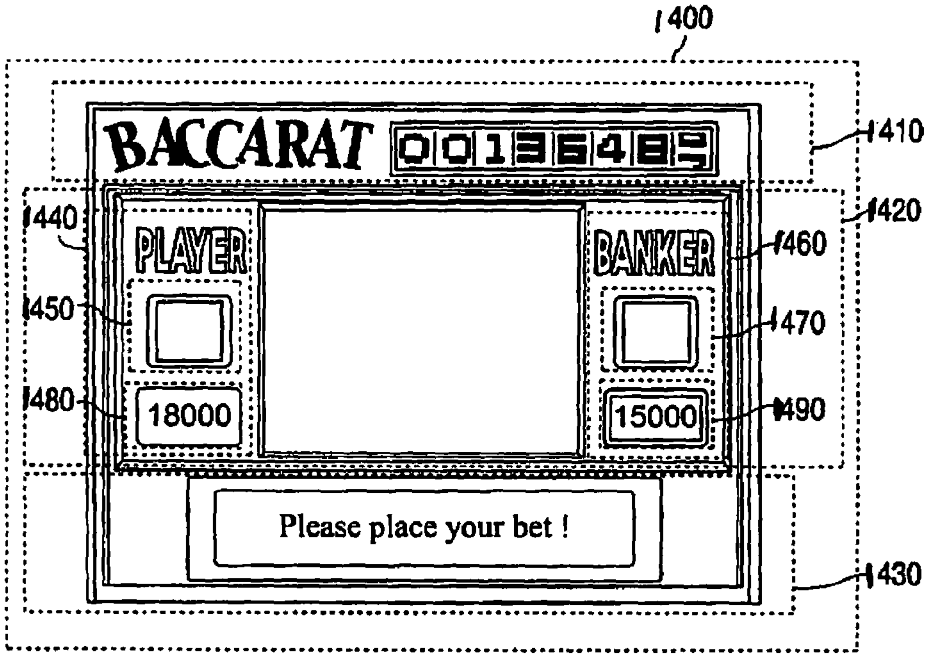
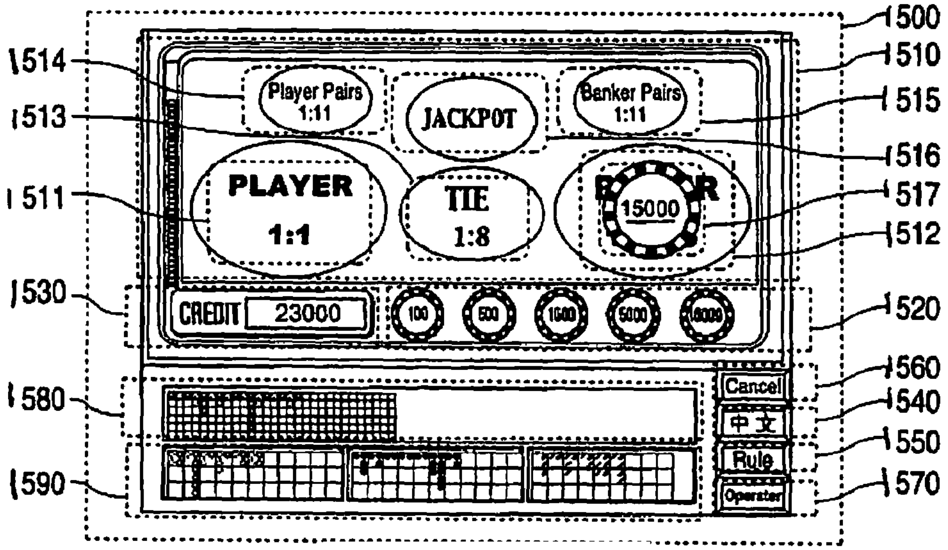
Figure 13B

GAMING CENTER ALLOWING SWITCHING BETWEEN GAMES BASED UPON HISTORICAL RESULTS

CROSS REFERENCE TO RELATED APPLICATIONS

The present application is a continuation-in-part application of U.S. application Ser. No. 11/897,590 filed Aug. 31, 2007, which is a continuation-in-part of U.S. application Ser. No. 11/800,885, filed on May 7, 2007 (issued as U.S. Pat. No. 8,308,559), and a continuation-in-part of application Ser. No. 13/042,633 filed Mar. 8, 2011 which is a continuation of Ser. No. 11/497,708 filed Aug. 1, 2006 (issued as U.S. Pat. No. 7,922,587), a continuation in part of application Ser. No. 11/312,150 filed Dec. 19, 2005 (issued as U.S. Pat. No. 7,914, 368), a continuation-in-part of application Ser. No. 11/198, 218 filed Aug. 5, 2005, and a continuation-in-part of application Ser. No. 11/042,732 (now issued as U.S. Pat. No. 7,918, 723) the teachings of each of which are incorporated herein in their entirety by reference.

BACKGROUND OF THE INVENTION

The present invention is generally directed to a gaming system that allows a player to select and play one or more live casino game(s) such as a live baccarat game and/or a non-live casino game(s).

In casino games, such as the baccarat game, there is generally a count-down time during which a player of the game will need to wait for the count-down result. This waiting period results in frustration of the player, waste of the resource of the gaming establishment, and, as the result, reduced revenue by the gaming establishment.

Additionally, casino games are generally ad hoc in nature. Games in a casino resort are generally played around the resort in several locations. Player(s) therefore have to go around the casino resort to select, view or play casino games. This also leads to waste of time, and, as the result, reduced revenue by the gaming establishment.

The embodiments described below address the above-described issues and needs.

SUMMARY OF THE INVENTION

The present invention provides a centralized gaming center in a casino resort. The gaming system comprises a computer server and a cabinet that allows a player to play any one or more games the player selects. All the games in one casino resort or several casino resorts can be linked to the computer server via a network. The network can be wired network or wireless network. The cabinet can include one, two, three, four, or several screens for displaying live casino games or non-live casino games. The cabinet can also include features such as key pads or key boards allowing a player to select a desired game or desired games and features common in a casino gaming terminal.

In some embodiments, the gaming system or gaming center allows a player to play a baccarat game and one or more other casino game. The one or more other casino games can be another baccarat game or a non-baccarat game. In some embodiments, the non-baccarat game can be a slot machine game, a casino card game, or a felt-table games. In some embodiments, the casino games are live casino games such as a baccarat game, a Sic Bo game, a Roulette game, a Fish-Prawn-Crab game, or a Wheel of Fortune game. In some embodiments, the casino game can be a non-live casino game such as a slot machine game. In some embodiments, the casino game can be video server based games including video slot games and other form of video games while players could also use many forms of mechanism including using touch screen mechanism to participate in the process.

In some embodiments, the main cabinet comprises a upper screen and a lower screen for playing the live casino game described above. The screen for displaying the non-live casino game, e.g., slot machine game, can be stand-alone screen or can be connected to the main cabinet. The screen for displaying the slot machine game can be fixed or foldable. In some embodiments, the screen for displaying the slot machine game is connected to the main cabinet, e.g., either connected to the upper screen or connected to the lower screen through a connection mechanism. The connection mechanism can be a hinge(s) or an arm(s). In some embodiments, the connection mechanism is integrated extension of the main cabinet, e.g., the upper or the lower screen. In some embodiments, the connection mechanism comprises hinge(s) (e.g., one, two, three or more hinges), allowing the screen for displaying the non-live casino game such as slot machine game to be folded to the main cabinet to cover up the upper screen or the lower screen. In some embodiments, the connection mechanism comprises a metallic arm or metallic arm(s) (e.g., one, two, three, or more arms).

In some embodiments, the screen for displaying a non-live casino game such as slot machine game and/or the live casino game such as live baccarat game can also allow the playing of non-live casino game such as slot machine games or baccarat games based on a stand alone server.

The mechanism for playing a casino game is well known in the art of gaming. Systems (e.g., devices and apparatus) or parts or components thereof embodying such gaming mechanism or a part thereof is either commercially available or can be readily constructed or built by an ordinary artisan.

In some embodiments, the present invention also provides a software program or a set of software programs for carrying out any or all steps of the betting method described herein. The gaming system can also be incorporated into an electronic device or an entertainment gaming machine. Representative electronic devices include, but are not limited to, laptop computers or desktop computers.

BRIEF DESCRIPTION OF DRAWINGS

FIGS. 13A, 13B and 13C show an embodiment of the present invention.

DETAILED DESCRIPTION

Figures 1A, 1B, 1C, 1D, 1E, 1F:
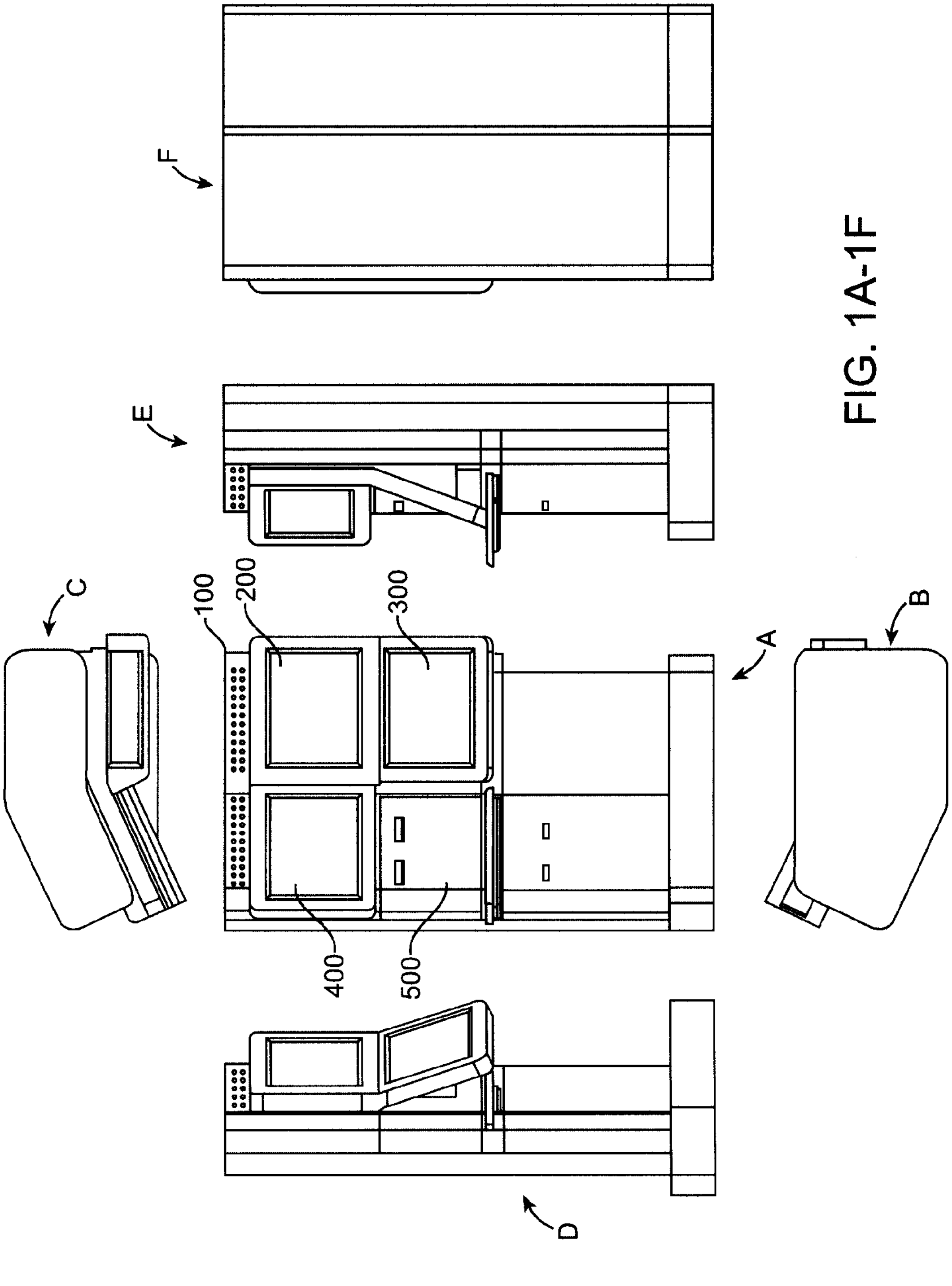
FIGS. 1A-1F shows an embodiment of the present invention.

The present invention provides a centralized gaming center in a casino resort. The gaming system comprises a computer server and a cabinet that allows a player to play any one or more games the player selects. All the games in one casino resort or several casino resorts can be linked to the computer server via a network. The network can be wired network or wireless network. The cabinet can include one, two, three, four, or several screens for displaying live casino games or non-live casino games. The cabinet can also include features such as key pads or key boards allowing a player to select a desired game or desired games and features common in a casino gaming terminal.

In some embodiments, the gaming center includes a Paradise Box Gaming System as described in U.S. application Ser. No. 11/800,885 with the server described above installed in the Paradise Box Gaming System.

In some embodiments, the gaming system or gaming center allows a player to play a baccarat game and one or more other casino game. In some embodiments, the gaming system includes a computer server. The one or more other casino games can be another baccarat game or a non-baccarat game. In some embodiments, the non-baccarat game can be a slot machine game, a casino card game, or a felt-table games. In some embodiments, the casino games are live casino games such as a baccarat game, a Sic Bo game, a Roulette game, a Fish-Prawn-Crab game, or a Wheel of Fortune game. In some embodiments, the casino game can be a non-live casino game such as a slot machine game. In some embodiments, the casino game can be video server based games including video slot games and other form of video games while players could also use many forms of mechanism including using touch screen mechanism to participate in the process.

In some embodiments, the main cabinet comprises a upper screen and a lower screen for playing the live casino game described above. The screen for displaying the non-live casino game, e.g., slot machine game, can be stand-alone screen or can be connected to the main cabinet. The screen for displaying the slot machine game can be fixed or foldable. In some embodiments, the screen for displaying the slot machine game is connected to the main cabinet, e.g., either connected to the upper screen or connected to the lower screen through a connection mechanism. The connection mechanism can be a hinge(s) or an arm(s). In some embodiments, the connection mechanism is integrated extension of the main cabinet, e.g., the upper or the lower screen. In some embodiments, the connection mechanism comprises hinge(s) (e.g., one, two, three or more hinges), allowing the screen for displaying the non-live casino game such as slot machine game to be folded to the main cabinet to cover up the upper screen or the lower screen. In some embodiments, the connection mechanism comprises a metallic arm or metallic arm(s) (e.g., one, two, three, or more arms).

In some embodiments, the screen for displaying a non-live casino game such as slot machine game and/or the live casino game such as live baccarat game can also allow the playing of non-live casino game such as slot machine games or baccarat games based on a stand alone server.

The mechanism for playing a casino game is well known in the art of gaming. Systems (e.g., devices and apparatus) or parts or components thereof embodying such gaming mechanism or a part thereof is either commercially available or can be readily constructed or built by an ordinary artisan.

In some embodiments, the present invention also provides a software program or a set of software programs for carrying out any or all steps of the betting method described herein. The gaming system can also be incorporated into an electronic device or an entertainment gaming machine. Representative electronic devices include, but are not limited to, laptop computers or desktop computers.

The rules of playing each casino game is well known in the art and well documented. Sometimes, rules for a game can be provided by gaming authorities. For examples, Macao Special Administrative Region the Gaming Inspection and Coordination Bureau of Macao Special Administrative Region, China, provides rules for rules for each casino games played in the region (http://www.dicj.gov.mo/CH/index.htm).

Rules for a few representative casino games are described below.

Live Baccarat Game

Baccarat games are common casino games. The object of baccarat is for the bettor to successfully wager on whether the banker's hand or the player's hand is going to win. The bettor receives even money for his wager if he selects the winning hand and loses his wager if he selects the losing hand. Because of the rules of play of baccarat, the banker's hand has a slightly higher chance of winning than does the player's hand. Therefore, if the bettor wagers on the banker's hand, the bettor is required to pay to the gaming establishment a commission (typically 5%) of the amount the bettor wins. No commission is paid if the bettor successfully wagers on the player's hand.

Conventional methods of playing baccarat are described as follows:

A multiple number of decks of standard playing cards, 52 in number, are used; typically six to twelve decks are shuffled together and placed in a shoe from which the cards are dealt during the play of the game.

Each bettor makes a wager on whether the banker's hand or the player's hand will win. After all wagers are made, two cards are dealt from the shoe to the bank position and two cards are dealt from the shoe to the player's position on the table layout. The cards are turned face up and the value of the banker's hand and the player's hand is determined.

Aces count as one; kings, queens, jacks and tens count as zero and the other cards count as their respective face value. The suits (hearts, diamonds, spades and clubs) have no meaning in baccarat. The highest hand value in baccarat is nine All hand values range from a low of zero to a high of nine. If when the cards are added together, the total of the hand exceeds nine, then the hand value is determined by subtracting ten from the total of the hand For example, a seven and nine total sixteen, but the hand value is six. An Ace and a nine total ten, but the hand value is zero.

A two card total of eight or nine is called a "natural"; a two card total of zero is called a "baccarat". As will be explained hereafter, in certain situations in the play of the game, a third card will be dealt. The value of this third card is added to the total of the first two cards and a new hand value is established. Again, if the new hand total exceeds nine, the hand value is determined by subtracting ten from the total of the hand. Wagering locations are provided on the baccarat table layout. Whichever of the banker's hand or the player's hand is closest to a total of nine is the winner.

The way of betting may differ in different gaming establishments. In the U.S., for example, prior to the deal, each bettor can make one of three wagers: 1) that the banker's hand will win, 2) that the player's hand will win, or 3) that the banker's hand and the player's hand will tie. In Macau, for example, one can make one of five wagers: 1) that the banker's hand will win, 2) that the player's hand will win, 3) that the banker's hand and the player's hand will tie, 4) that the first two cards in the banker's hand are of the same kind, regardless of the type of suit, forming a Bank Pair, or (5) that the first two cards in the player's hand are of the same kind, regardless of the type of suit, forming a Player Pair.

All winning banker's hand wagers in scenario 1) in both the U.S. and Macau are paid off at odds of one-to-one and the house charges a five percent (5%) commission on the amount won by the bettor. For example, if a bettor wagers $100 on the banker's hand and the banker's hand wins, the bettor wins $100 and is charged a $5 commission on the amount that the bettor won. The bettor is not charged any commission on the amount of his wager.

All wagers that select winning player's hand in scenario 2) in both the U.S. and Macau are paid off at odds of one-to-one and the bettor is not charged any commission on the amount of his winnings or his wager.

All winning wagers on the tie in scenario 3) in both the U.S. and Macau can be paid off at odds of eight-to-one (depending on the gaming establishment) and the bettor is not charged any commission on the amount of his winnings or his wager. If a tie hand occurs, all wagers on the banker's hand and all wagers on the player's hand are "pushes" and the amount wagered is returned to the bettor.

All winning wagers on the Bank Pair bet in scenario 4) in Macau can be paid off at odds of eleven-to-one (depending on the gaming establishment) and the bettor is not charged any commission on the amount of his winnings or his wager.

All winning wagers on the Player Pair bet in scenario 5) in Macau can be paid off at odds of eight-to-one (depending on the gaming establishment) and the bettor is not charged any commission on the amount of his winnings or his wager.

The play of baccarat typically uses three casino dealers to operate the game. The casino dealers jointly participate in the shuffling of the decks of cards. After the shuffle is completed, one of the players is typically asked to cut the decks using a plastic cut card. The dealer then separates and restacks the cards from the point of the cut and the dealer or a player then inserts the plastic cut card no less than fifteen cards (in Las Vegas, U.S.) or no less than twelve cards (in Macau) from the ends of the stacked decks and the entire stacked decks are placed into a shoe from which the cards are dealt during the play of the game. When the inserted plastic cut card appears during play, the hand in progress is completed and that round of play then ends. The cards are reshuffled to prepare for the next round of baccarat.

In conventional baccarat, the bettors deal the cards used in the game. Initially, one of the casino dealers (called the "caller") passes the shoe to the bettor sitting in seat number "1" at the baccarat table. After all wagers have been made, the caller tells the bettor with the shoe to begin the deal. The bettor deals a first card to the caller, a first card to himself, a second card to the caller and a second card to himself All cards are dealt face down. The two cards given to the caller represent the player's hand and the two cards kept by the bettor who is dealing the cards represent the banker's hand.

The caller than allows one of the other bettors to turn up the player's hand. Traditionally, this honor is given to the bettor who has made the largest wager. The bettor turns up the two cards of the player's hand and tosses them to the caller. The caller places these two cards face up in the table location designated for the "player's hand" and the caller announces the point total of the player's hand The bettor who has the shoe then turns over the cards of the banker's hand and tosses these two cards to the caller. The caller places these two cards face up in the table location designated for the "banker's hand" and the caller announces to point total of the banker's hand Depending on the point total of the player's hand and the banker's hand, one more card may be dealt to either the player's hand, the banker's hand, or both. The rules for determining whether a third card is dealt are fixed rules, there is no discretion for either the player's hand or the banker's hand on whether a third card is dealt.

If either the player's hand or the banker's hand has a point total of eight or nine on the first two cards, no third card is dealt to either hand and the hand with the highest point total is the winner (or the hand is a tie, as the case may be). If none of the player's hand or the banker's hand has a point total of eight or nine, then there is a possibility of a third card draw.

The third card draw rules are as follows:

Rule #1: If the initial two card player's hand has a point total of 0, 1, 2, 3, 4 or 5, draws a third card. If the initial two card player's hand has a point total of 6 or 7, the player's hand stands and does not receive a third card.

Rule #2: If the player's hand stands and does not draw a third card, then the banker's hand follows Rule #1. In other words, if the player's hand has a point total of 6 or 7, the banker's hand draws a third card on a point total of 0, 1, 2, 3, 4 or 5 and the banker's hand stands on a point total of 6 or 7.

Rule #3: If the player's hand draws a third card, the banker's hand must draw or stand as described in Table 1.

TABLE 1

| Bank hand two card point total | Bank hand draws when the player's hand third card is: | Bank hand stands when the player's hand third card is: |
|---|---|---|
| 0, 1 or 2 | Bank always draws | |
| 3 | 0, 1, 2, 3, 4, 5, 6, 7 or 9 | 8 |
| 4 | 2, 3, 4, 5, 6 or 7 | 0, 1, 8 or 9 |
| 5 | 4, 5, 6 or 7 | 0, 1, 2, 3, 8 or 9 |
| 6 | 6 or 7 | 0, 1, 2, 3, 4, 5, 8 or 9 |
| 7 | | Bank always stands |

All third card draw determinations are automatically made by the caller who is skilled in the game of baccarat. When the rules of baccarat require a third card for the player's hand, the caller will request a card for the player's hand. After the player's hand is completed, the banker's hand is completed in the same fashion. The caller then declares which hand has the highest point total and declares that hand the winner (or the caller declares a tie hand as the case may be).

In conventional baccarat the bettor who acts as the dealer continues to deal the cards until the player's hand wins. As soon as the player's hand wins, it is customary to pass the shoe counterclockwise around the baccarat table to the next bettor so that each bettor has the opportunity to deal the cards. Any bettor may decline to deal the cards. The fact that one of the bettors is physically dealing the cards has no affect on the outcome of the game because the rules for drawing and standing do not allow any discretion on the part of the players. The conventional baccarat rules can vary in different gaming jurisdictions. For example, in Macao, all other felt games must be handled by licensed and registered persons.

The players can play the game according to conventional baccarat rules, which may vary from place to place. In one embodiment, the baccarat game is played according to the U.S. rules as used in Las Vegas.

In another embodiment, the baccarat game is played according to the baccarat rules promulgated by the government of Macau Special Administration Region. In Macao, only dealers are eligible to touch the shoe at all time unless on very special situation in VIP rooms. In live baccarat game in Macau, all cards are being handled by licensed and registered dealers representing the concessionary holders (e.g., one of the 6 concessionary holders in Macao, namely, SJM, Galaxy, MGM, LVS etc).

Roulette

Roulette games are generally grouped into two categories: the European Roulette or English Roulette or the American Roulette. The following provides a general description of the game of Roulette and the rules playing the game.

American Roulette

The Wheel

The game of American Roulette is played on a wheel which consists of thirty-eight slots, each with its own number. The numbers on a Roulette wheel are 1-36, 0, and 00. The numbers alternate pairs of odd numbers with pairs of even numbers. The numbers also alternate between black and red. Both the 0 and 00 slots are green. A dealer, or croupier spins the wheel in one direction and then rolls a small ball in the other direction. The ball then drops into one of the slots as it begins to slow down.

The Table

The table is designed so that the numbers, not including 0 and 00, are lined up into three columns, each of twelve numbers, the first row is 1, 2, 3; the second row is 4, 5, 6 and so on. The rest of the table is devoted to the myriad bets the game entails. Betting is broken down into two major categories, inside bets and outside bets. There is no limit to the number of bets one can play Inside Bets Straight Bets This is betting that one particular number on the wheel will come up. This bet is done by placing a chip on top of the number on which you want to bet. If that number wins, the payoff is 35 to 1.

Split Bets

This is betting that one of two numbers that lie next to each other on the table will win. Placing a chip on the line that separates two numbers does this. You win if the ball lands on either number. The payoff is 17 to 1.

Street Bet, Trio Bet, or Three Number Bet

In this bet, a player is wagering that any number in a particular row will hit on the next spin. To make this bet, you must place a chip in the outside line of the row on which you want to bet. You win if any number in the row comes up. The payoff is 11 to 1.

Corner Bet, Square Bet, or Four-Number Bet

This bets that one of four numbers will hit on the next spin. The numbers should all be touching and moving a chip into the center of four numbers places the bet. If one of these numbers comes up, you win. This bets pays 8 to 1.

Five-Number Bet

This is betting that either the 0, 00, 1, 2, or 3 will come up on the next roll. To take this bet, place a chip on the outside line that divides the 0 and 1. You will be paid 6 to 1 if any of these numbers come up.

Six Line Bet

This is betting that one of six numbers in two adjacent rows will come up. Place a chip in between two rows on the outside line. If the ball lands on any number in the two rows, you will be paid 6 to 1.

Outside Bets

Red

You are betting that the next number to come up is a red. If the next number landed is red, you will be paid 1 to 1, or even money. To play this bet, place a chip on the box marked "Red".

Black

You are betting that the next number to come up is a black. If the next number landed is black, you will be paid 1 to 1, or even money. To play this bet, place a chip on the box marked "Black".

Even

This is wagering that the ball will land on an even number. This bet does not include 0 or 00. The payoff is 1 to 1. To play this bet, place a chip on the box marked "Even".

This is wagering that the ball will land on an odd number. The payoff is 1 to 1 if the next number to come up is odd. To play this bet, place a chip on the box marked "Odd".

Low Bet

This is a bet that the next number will be between 1 and 18. The payout is 1 to 1. To play this bet, place a chip on the box marked "Low".

High Bet

This is a bet that the next number will be between 19 and 36. The payout is 1 to 1. To play this bet, place a chip on the box marked "High".

Dozen Bet

These bets divide the table into the numbers 1-12, 13-24, and 25-36. To play this bet, put a chip in one of the three boxes marked "1st 12", "2nd 12" or "3rd 12". This bet pays 2 to 1.

Column Bet

This bets that a number in a particular column will come up on the next spin. The payoff is 2 to 1 and is done by placing a chip at the end of the layout below your desired column where it is marked "2 to 1".

English Roulette

The major difference between English and American Roulette is that English has only a 0 instead of both 0 and 00.

Sic Bo

Sic Bo is an ancient Chinese game meaning 'Dice Pair'. It is played in Southeast Asia, Korea, Nevada and Australia. It is also popular in the Philippines, where it is called 'Hi-Lo'. Sic Bo is played with three dice. The object of the game is to select the individual numbers, or combinations of numbers, that will appear on the dice after the 'throw'.

The possibilities include single dice numbers, two of a kind, three of a kind, or combinations of any two or three of the dice. These are displayed along with payoff odds on the table's layout.

To start, the players make their selection of a possible outcome and place a bet on a chosen possibility. After the bets are made, the dice tumbler is rotated and then set on the table. All winning possibilities of the three dice appear illuminated on the layout.

Winning payoffs range from 1:1 even money for one-of-a-kind, to 180:1 for a specific trio.

Slot Machine Games

Slot machine games are common in all the casino resorts. The rules and general steps of playing a slot machine game is described below:

1. Click "Insert Money" to begin playing.

2. Place one's bet by choosing credits in the denominations offered. The player can usually adjust his/her bet on the left side of the slot machine.

3. View one's balance in the slot machine's credit box.

4. The player can bet the maximum limit by clicking on "Bet Max."

5. If the player does not want to bet the maximum, he/she can click on "Bet One" for individual credits.

6. If the player hits a winning combination, he/she can see your payout on the Payout Table. To check and see how much he/she has won, click on the "Winner Paid" icon.

7. It's usually possible to switch machines while playing the same game. Check for a "Switch Machine" button if you want to try your luck somewhere else.

Description of the Gaming System

The gaming system described herein can be in any design. FIGS. 1A-1F show an embodiment of the present invention.

In FIG. 1A, the gaming system includes a main cabinet 100, a server (not shown), screen 200, screen 300, screen 400, and betting terminal 500. The server can be a stand alone server or included in main cabinet 100 and can include a chip, a memory, and optionally a database. The server is either commercially available or can be readily constructed by a person of ordinary skill in the art. Screens 200, 300 and 400 can display live casino games or non-live casino games. Betting terminal 500 comprises mechanisms (not shown) that allow a player to place a bet on a live casino game or a non-live casino game. The gaming system also includes a mechanism for selecting one or more live casino game(s) (not shown) and a mechanism for playing the one or more live casino game(s) (not shown). The gaming system can also include a mechanism for selecting one or more non-live casino game(s) (not shown) and a mechanism for playing the one or more non-live casino game(s) (not shown). Note, the mechanisms for selecting or playing one or more live or non-live casino game(s) can be included in any place in the gaming system.

FIG. 1B shows the bottom view of the gaming system shown in FIG. 1 A.

FIG. 1C shows the top view of the gaming system shown in FIG. 1 A.

FIGS. 1D-1E show two perspective views of the gaming system shown in FIG. 1A.

Figure 1G:
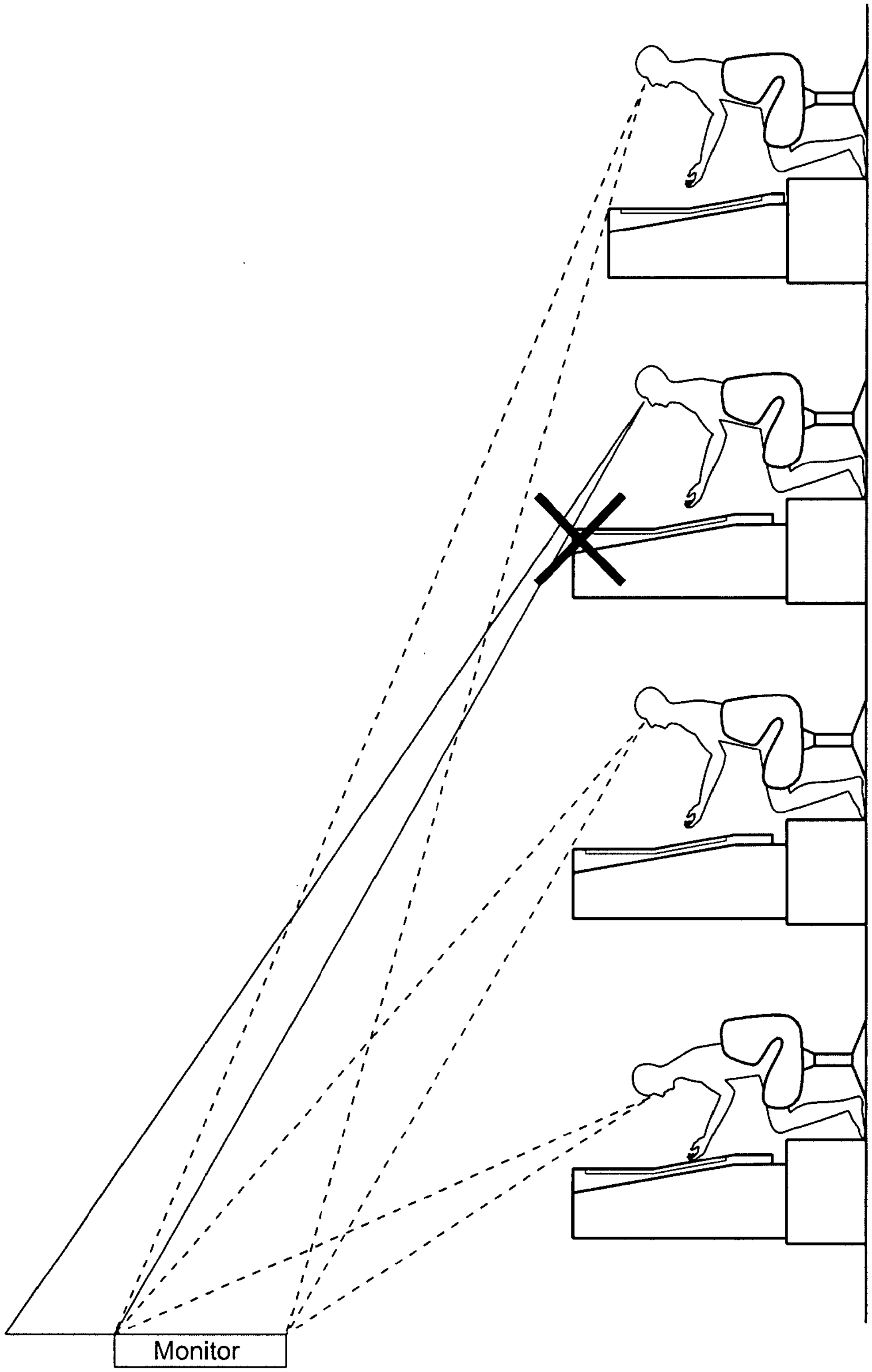
FIG. 1G illustrates a live baccarat player in the count down time of a live baccarat game.

FIG. 1F shows the side view of the gaming system shown in FIG. 1A. FIG. 1G illustrates a live baccarat player in the count down time of a live baccarat game.

Figure 2:
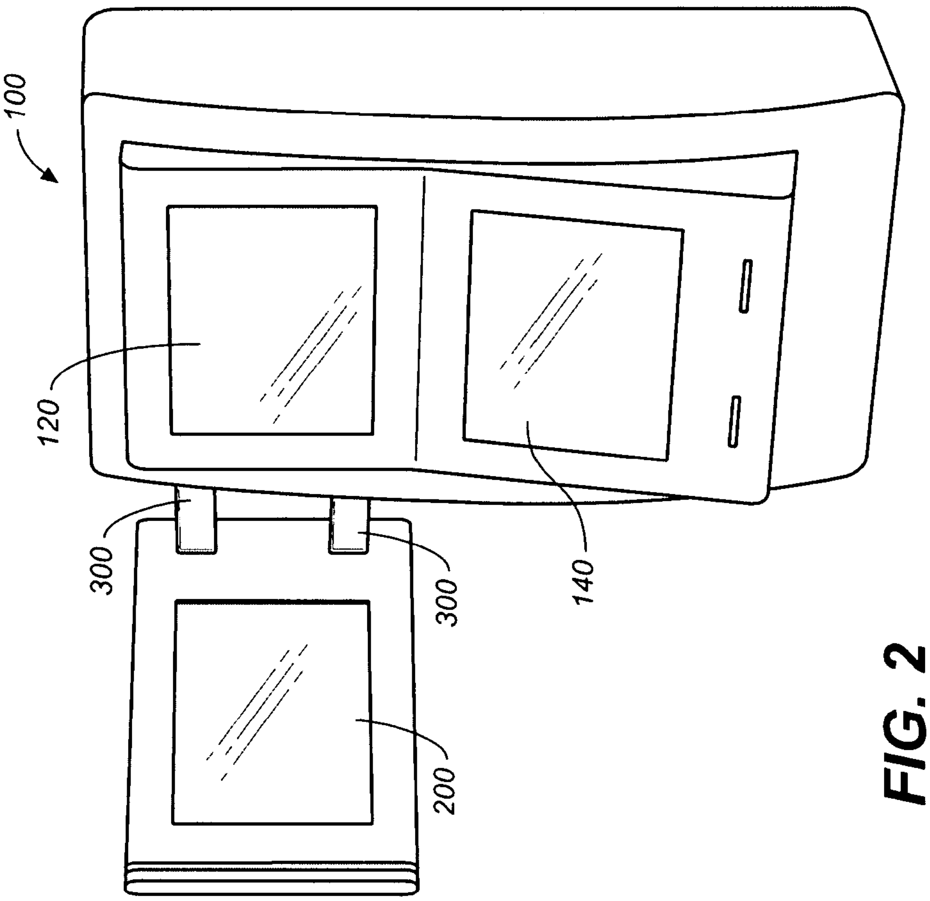
FIG. 2 shows an embodiment of the present invention where a screen for displaying a slot machine game being connected to the upper screen of the main cabinet of a live baccarat gaming system via two hinges.
Figure 3:
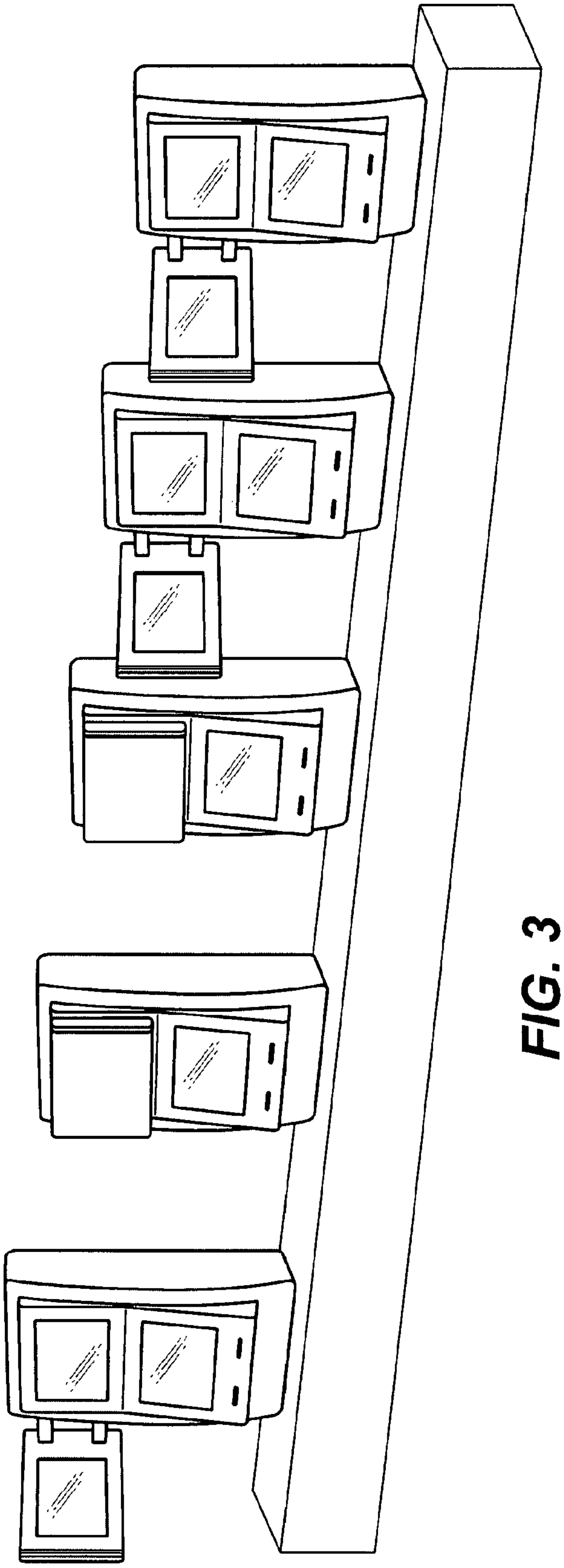
FIG. 3 shows the gaming system of FIG. 2 in a cluster.

The various embodiments of the present invention are described in reference to FIGS. 2-11. Referring to FIG. 2, the gaming system described herein includes a main cabinet 100, which includes an upper screen 120 and a lower screen 140, a screen 200 for displaying slot machine games, and two hinges 300 connecting screen 200 to main cabinet 100. Screen 200 is foldable and can be folded to cover upper screen 120 (FIG. 3). FIG. 3 shows the gaming system of FIG. 2 in a cluster, whereby a plurality of players can use the gaming system to play a game and a slot machine game. It is also envisioned that the screens are not separate screens, but portions of a screen within a single screen.

Figure 4:
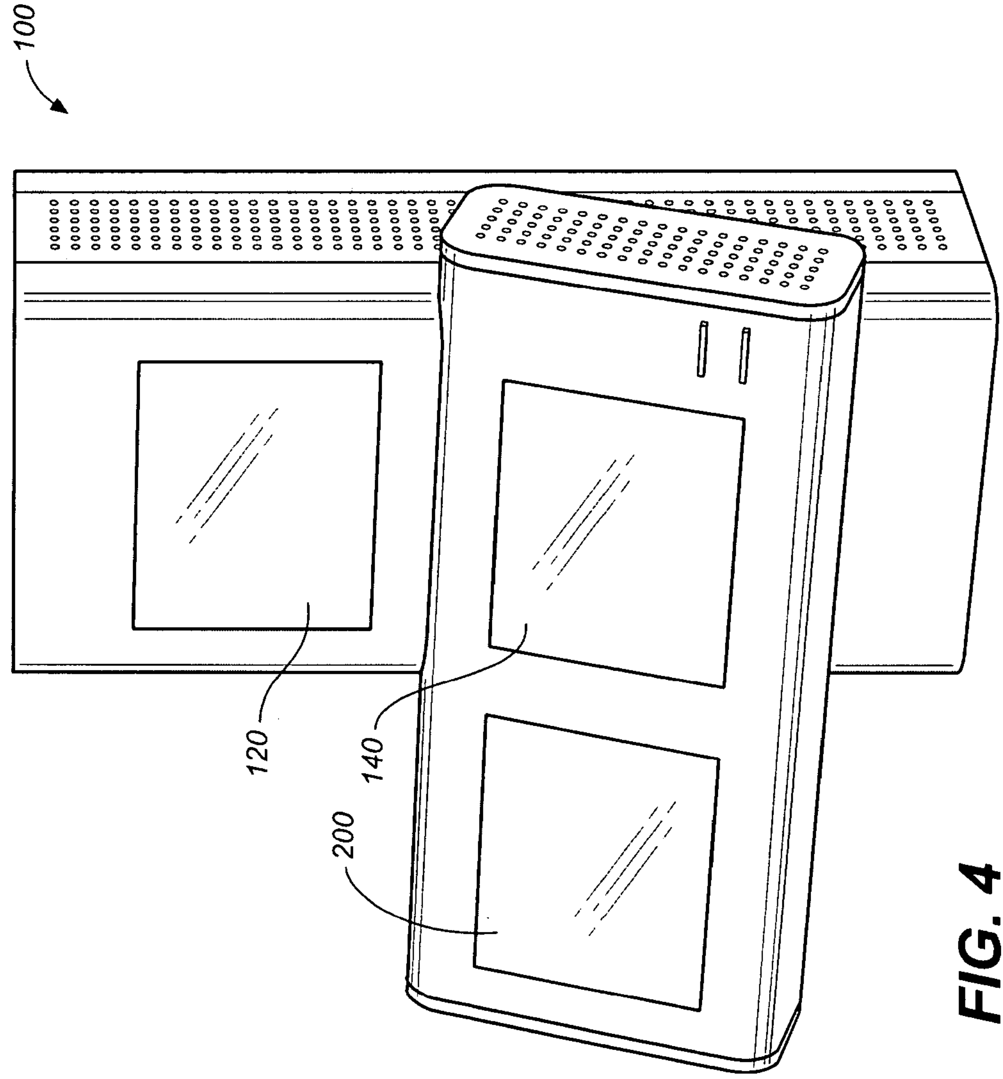
FIG. 4 shows an embodiment of the present invention where a screen for displaying a slot machine game is connected to and extended from the lower screen of the main 20 cabinet of a live baccarat gaming system.

Referring to FIG. 4, the gaming system includes a main cabinet 100, which includes an upper screen 120 and a lower screen 140, and a screen 200 for displaying slot machine games. The screen 200 is connected to and integratedly extended from lower screen 140 such that screen 200 and lower screen 140 become a single body.

Figure 5:
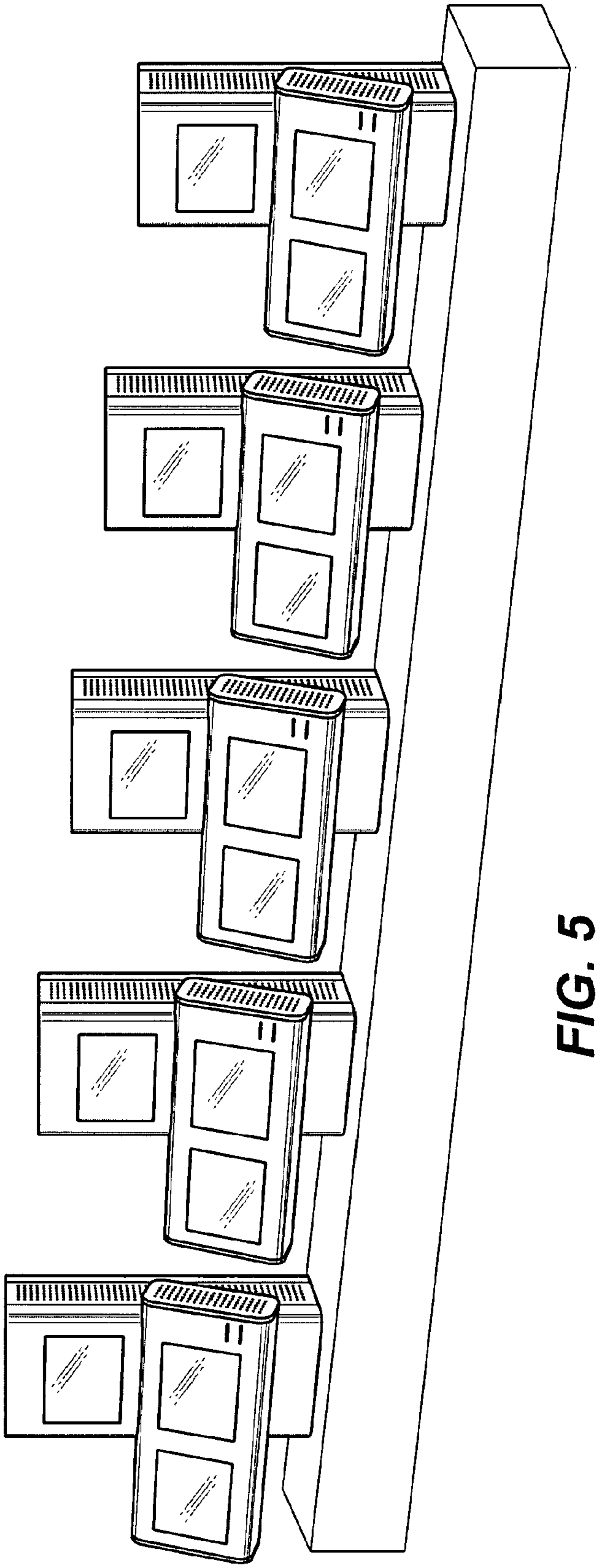
FIG. 5 shows the gaming system of FIG. 4 in a cluster.

FIG. 5 shows the gaming system of FIG. 4 in a cluster, whereby a plurality of players can use the gaming system to play a game and a slot machine game.

Figure 6:
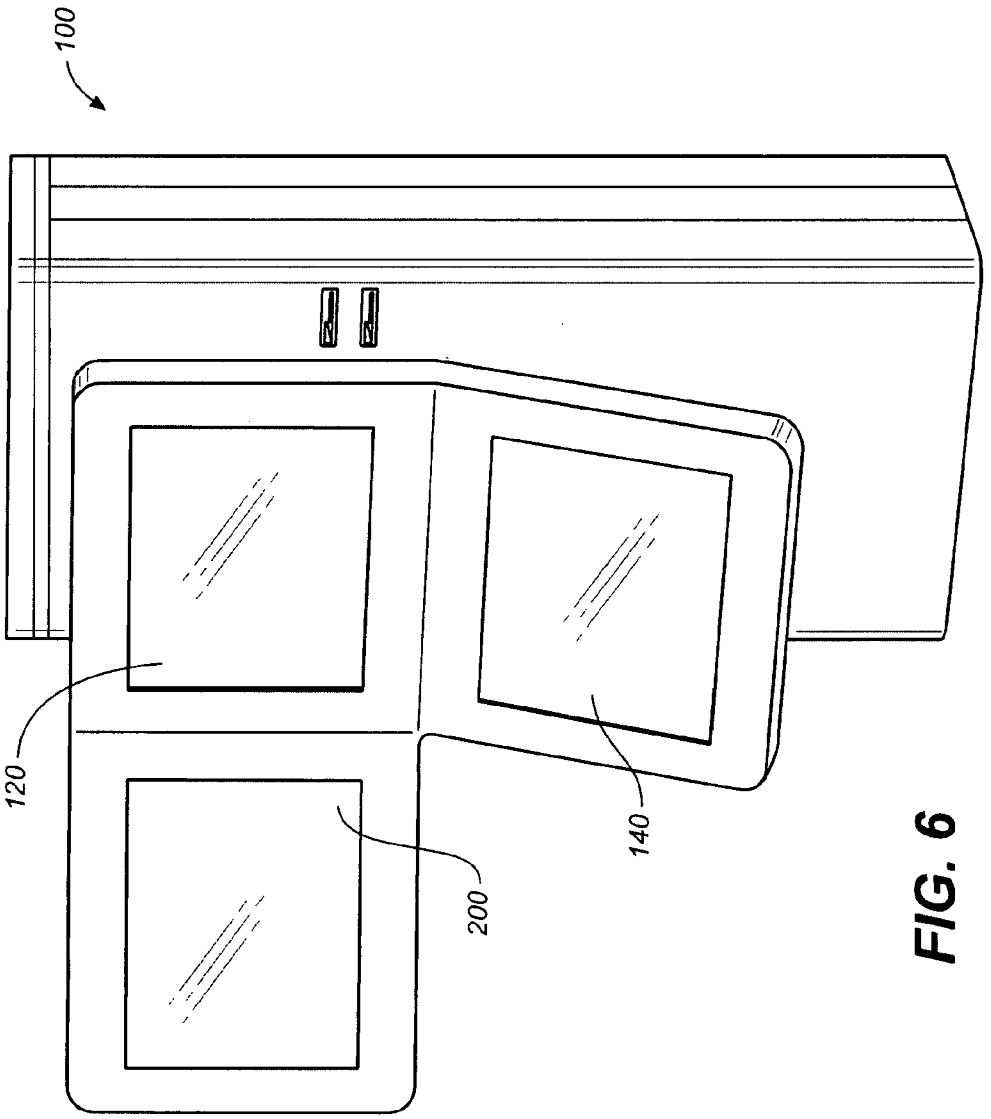
FIG. 6 shows an embodiment of the present invention where a screen for displaying a slot machine game is connected to and extended from the upper screen of the main cabinet of a live baccarat gaming system.
Figure 7:
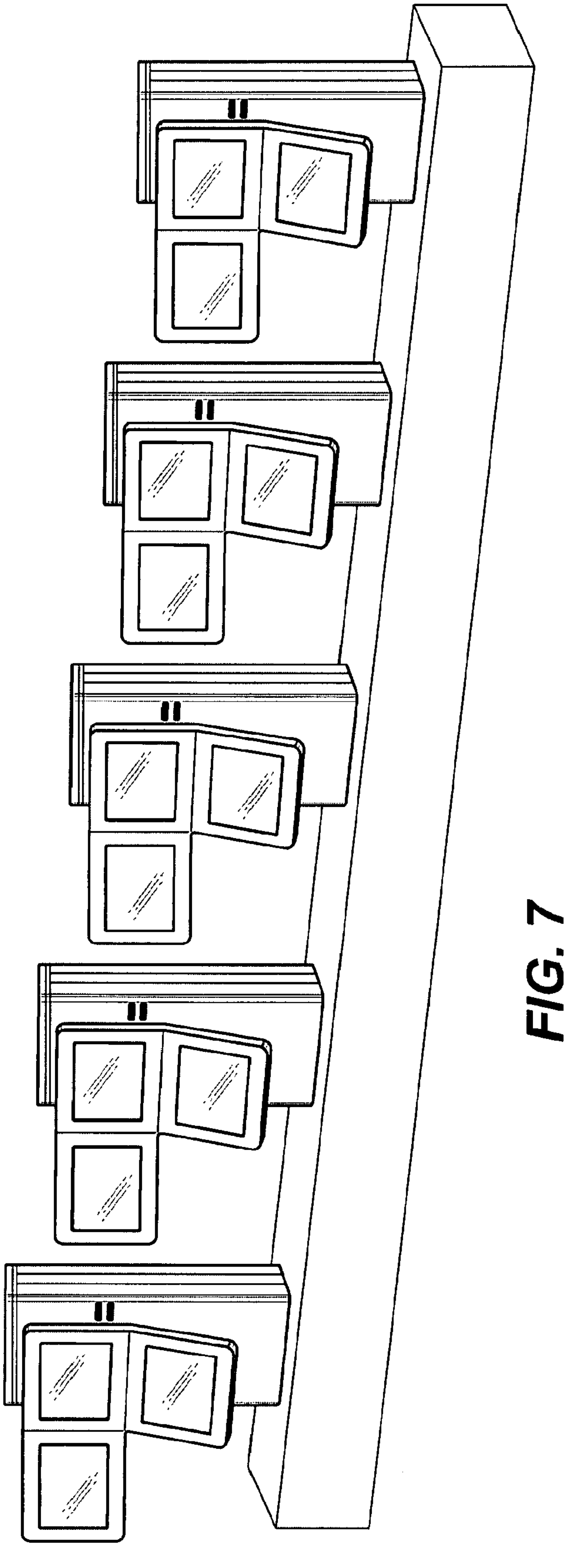
FIG. 7 shows the gaming system of FIG. 6 in a cluster.

Referring to FIG. 6, the gaming system includes a main cabinet 100, which includes an upper screen 120 and a lower screen 140, and a screen 200 for displaying slot machine games. The screen 200 is connected to and integratedly extended from upper screen 120 such that screen 200 and upper screen 120 become a single body. FIG. 7 shows the gaming system of FIG. 6 in a cluster, whereby a plurality of players can use the gaming system to play a game and a slot machine game.

Figure 8:
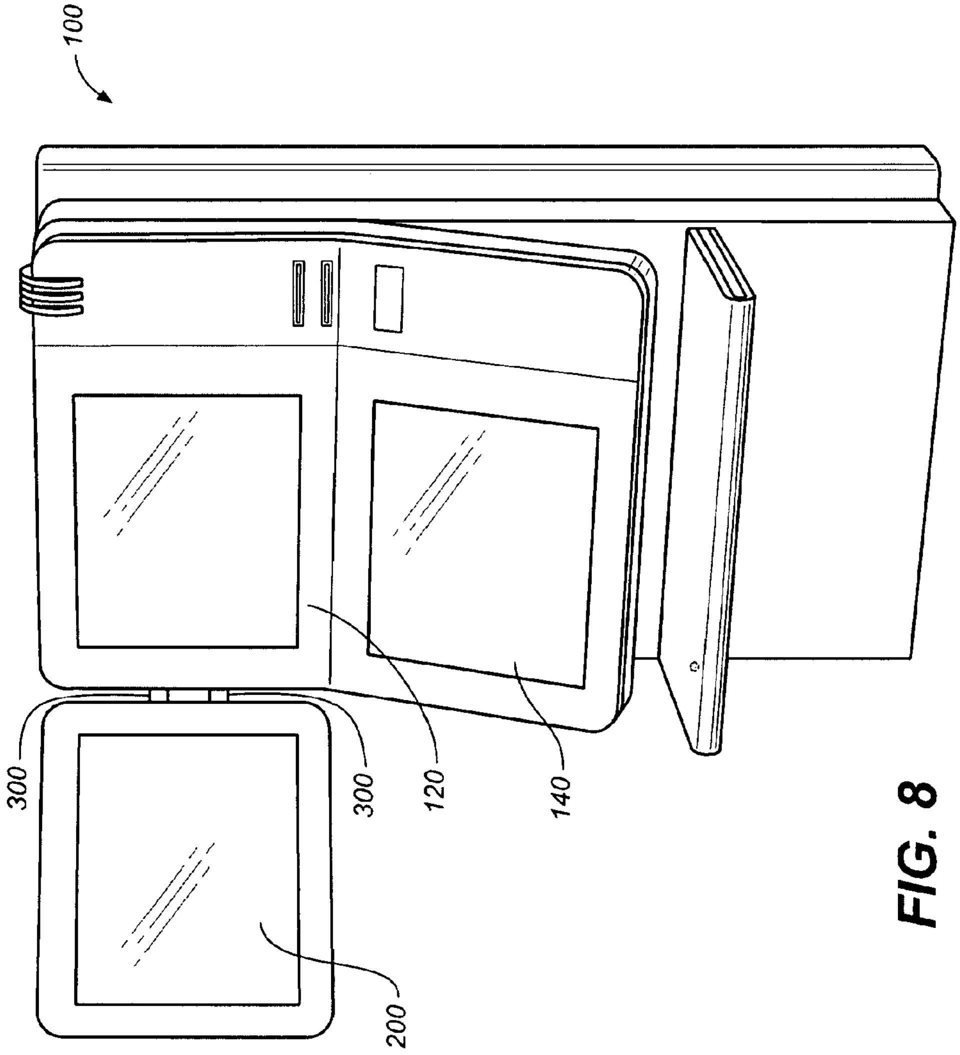
FIG. 8 shows an embodiment of the present invention where a screen for displaying a slot-machine game being connected to the upper screen of the main cabinet of a live baccarat gaming system via two metallic arms.
Figure 9:
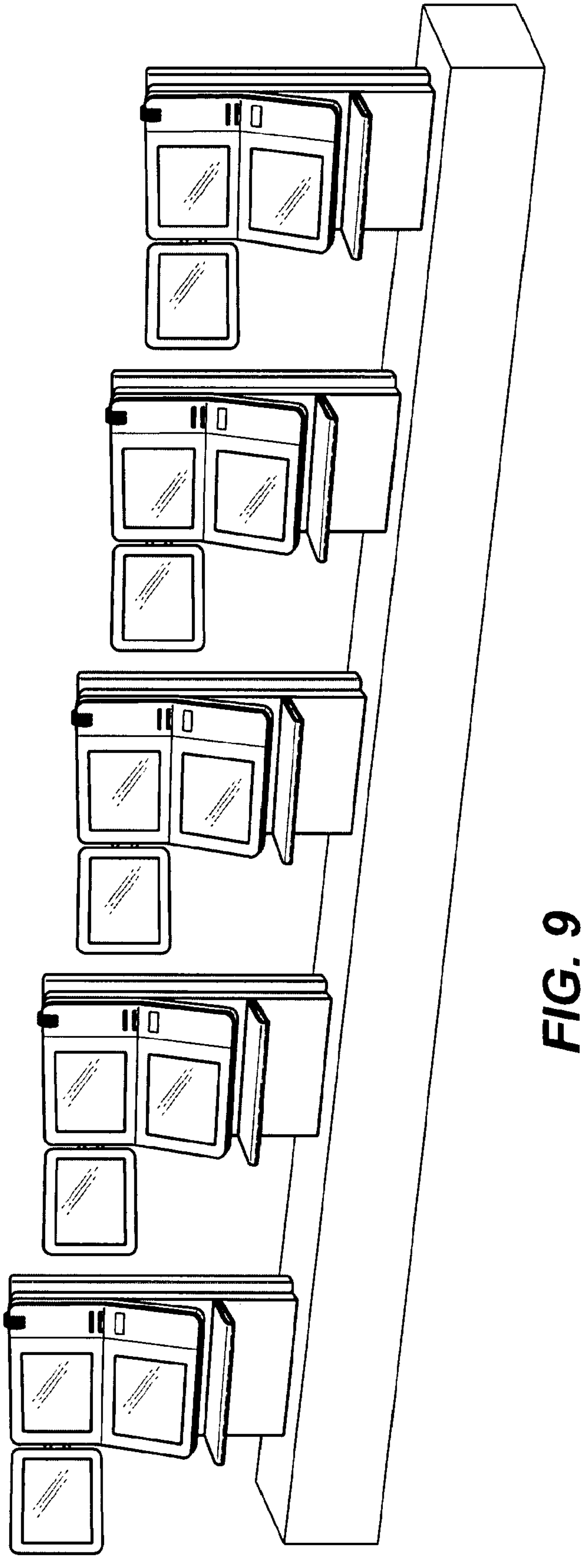
FIG. 9 shows the gaming system of FIG. 8 in a cluster.

Referring to FIG. 8, the gaming system described herein includes a main cabinet 100, which includes an upper screen 120 and a lower screen 140, a screen 200 for displaying slot machine games, and two metallic arms 300 connecting screen 200 to main cabinet 100 by the side of upper screen 120. FIG. 9 shows the gaming system of FIG. 8 in a cluster, whereby a plurality of players can use the gaming system to play a game and a slot machine game.

Figure 10:
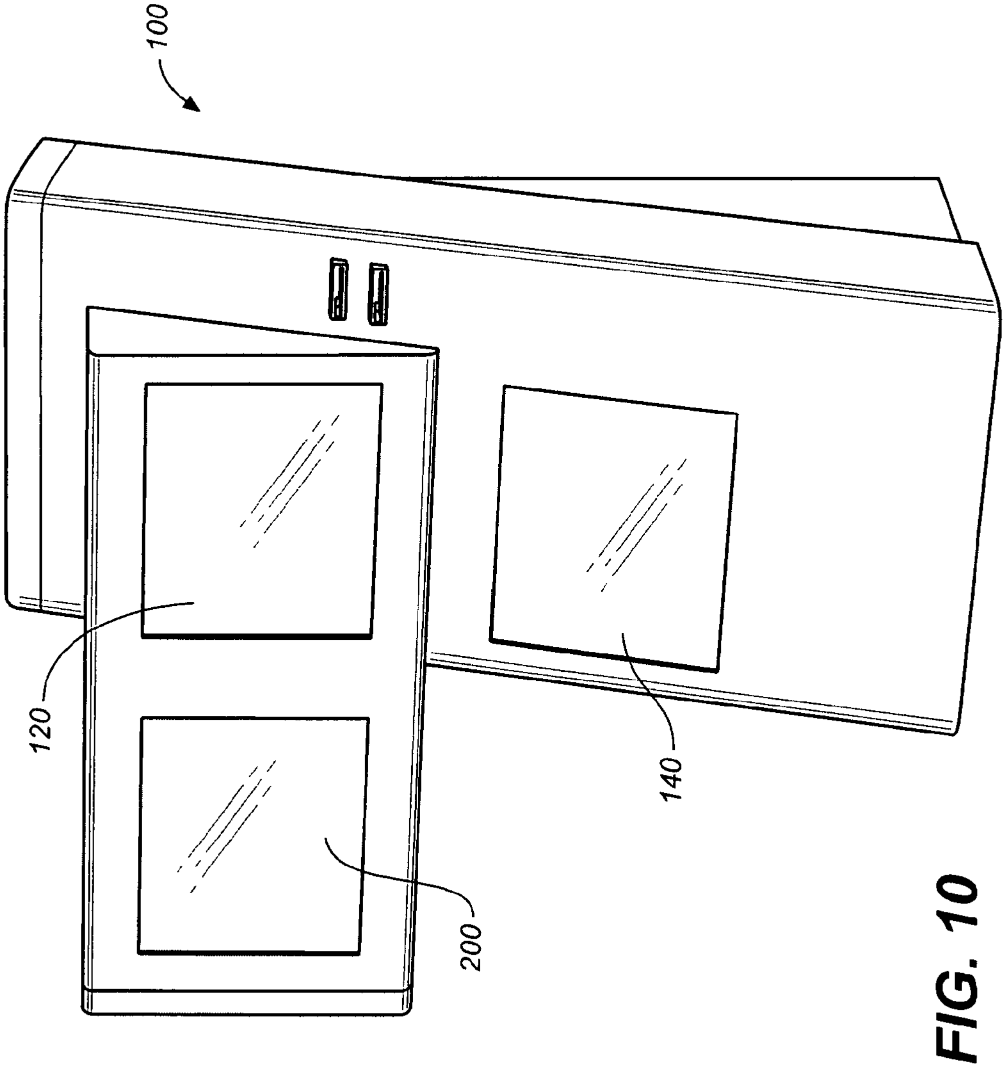
FIG. 10 shows an embodiment of the present invention where a screen for displaying 10 a slot machine game being connected to and extended from the upper screen of the main cabinet of a live baccarat gaming system.
Figure 11:
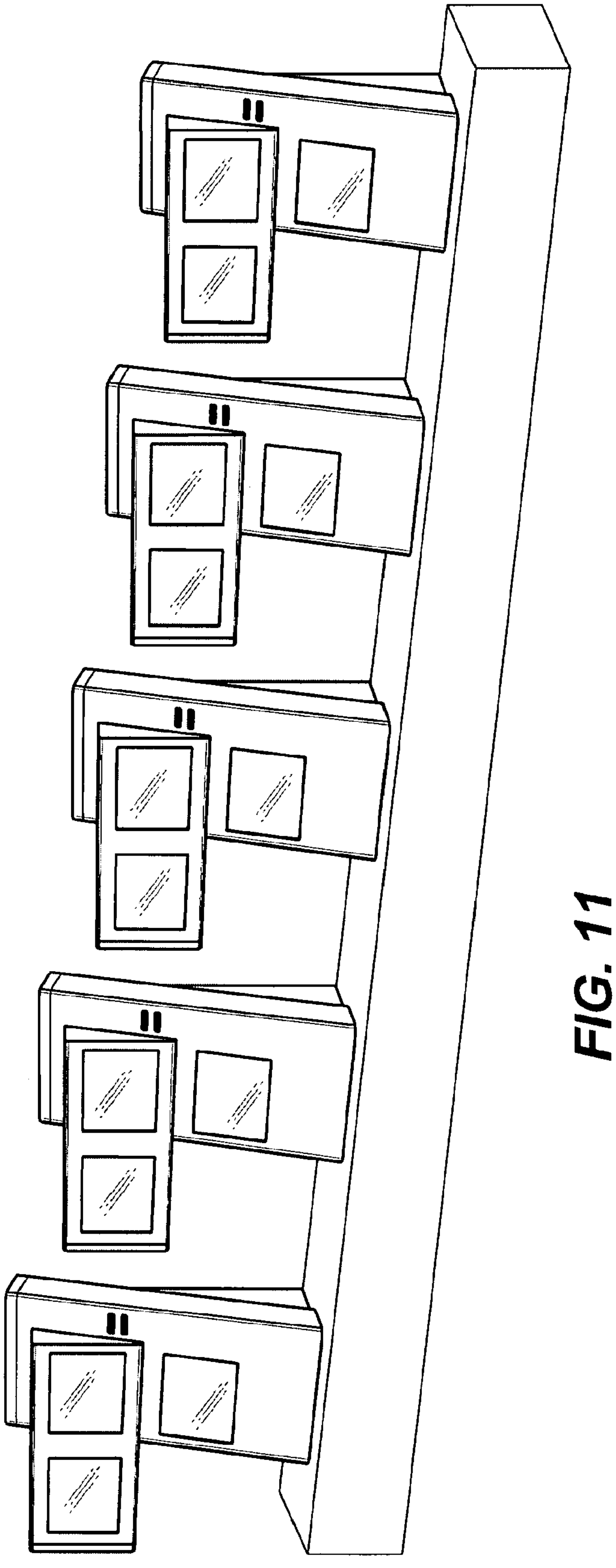
FIG. 11 shows the gaming system of FIG. 10 in a cluster.

Referring to FIG. 10, the gaming system includes a main cabinet 100, which includes an upper screen 120 and a lower screen 140, and a screen 200 for displaying slot machine games. The screen 200 is connected to and integratedly extended from upper screen 120 such that screen 200 and upper screen 120 become a single body. In relation to the surface plane of the main cabinet, upper screen 120 and screen 200 are out of the surface plane of the main cabinet, and lower screen 140 is in the surface plane of the main cabinet. FIG. 11 shows the gaming system of FIG. 10 in a cluster, whereby a plurality of players can use the gaming system to play a game and a slot machine game.

Figure 12A:
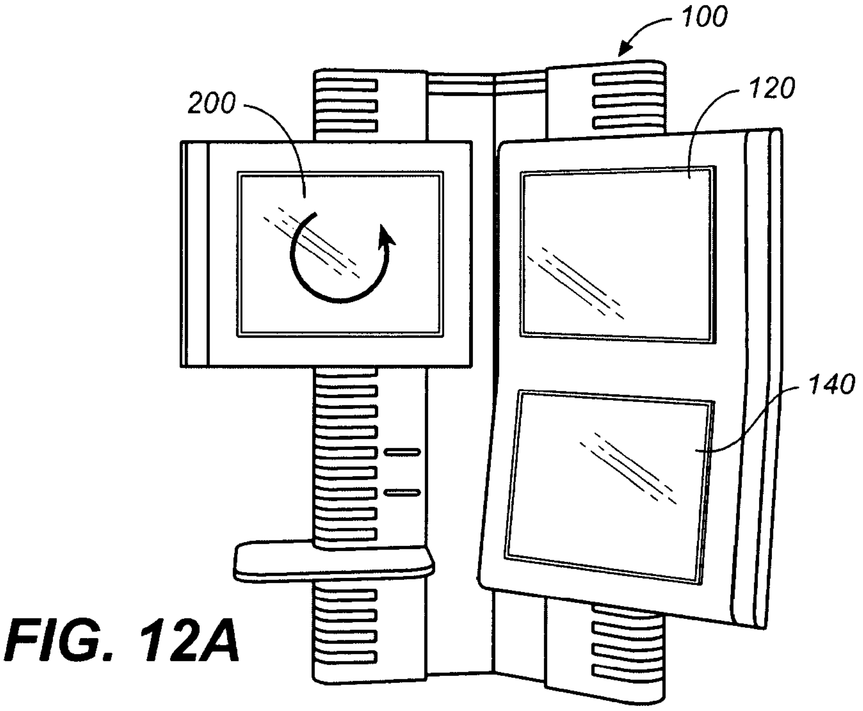
FIGS. 12A and 12B show an embodiment of the present invention where a screen for displaying a slot machine game being attached the main cabinet of a live baccarat gaming system.
Figure 12B:
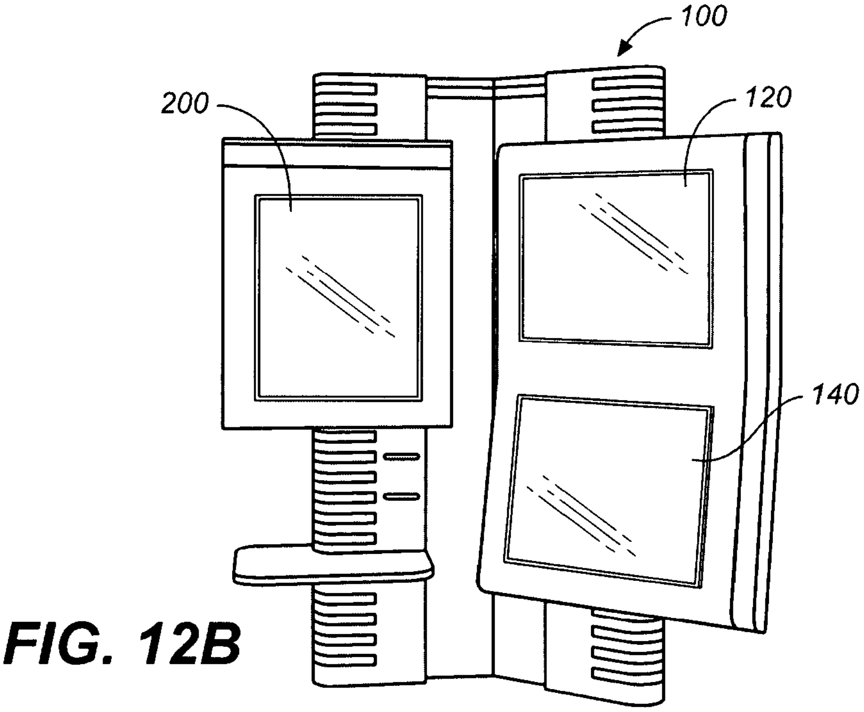

Referring to FIGS. 12A and 12B, the gaming system includes a main cabinet 100 having an upper screen 120 and a lower screen 140 connected or otherwise attached thereto. A screen 200 for displaying a slot machine game is attached to the main cabinet 100 by the side of the upper screen 120. In some embodiments, the screen 200 can be attached to the main cabinet 100 by the side of the lower screen 140. In some embodiments, the screen 200 can be rotated (FIG. 12A) to have an angle (e.g., 90 degree) in relation to screen 120 or screen 140. The screen for displaying a slot machine game of the various embodiments described above can be fixed or folded. A person of ordinary skill in the art can readily construct a gaming system or device according to the above description.

Referring to FIGS. 13A and 13B, a layout for the gaming system described herein is shown in FIGS. 13A and 13B. FIGS. 13A and 13B show the overall layout of the betting terminal which has two portions of screens, the upper screen portion (1400) and the lower screen portion (1500), shown in detail in FIGS. 13A and 13B. Referring to FIG. 13A, upper screen portion 1400 includes an upper part (1410) for displaying the result, score and latest jackpot amount, the center part (1420) for displaying a live video of the gambling table, and a messenger screen (1430) for displaying messages. In one embodiment, the jackpot amount digits can be programmed to be in rolling motion to reflect the increasing jackpot pool. The center part of the upper screen has a section designated as Player (1440), which has a small screen (1450), and another section designated as Banker (1460), which also has a small screen (1470). The small screens 1450 and 1470 are for display of card values of the player hand and the bank hand respectively. The current amount of total wagers on Player (player hand) and Banker (bank hand) in a live baccarat game are shown in small screens 1480 and 1490 below small screens 1450 and 1470, respectively. Of course, any live table game could be displayed, as will be appreciated by those of skill in the art.

Referring to FIG. 13B, the lower screen portion 1500 may be an operating touch screen for betting, which includes bet-option buttons (1510), bet-amount buttons (1520), and credit window (1530). The bet-option buttons 1510 include the various betting selections described above, e.g., betting for player hand (1511) win with a payoff rate of 1:1, for the bank hand (1512) win with a payoff rate of 1:0.95, for tie (1513) with a payoff rate of 1:8, for Player Pairs (1514) with a payoff rate of 1:11, for banker pairs (1515) with a payoff rate of 1:11, and for Jackpot bet (1516), the rules of which are described above. Box 1517 shows the pops up when bets are placed on a particular bet option. The number inside Box 1517 corresponds to the amount placed on a particular bet option. The bet-amount buttons 1520 as shown in the layout, 100, 500, 1000, 5000, 10000, provide the players the convenience of adding up betting amounts in a fast manner. To illustrate, for a bet of 10,000 USD or HKD, the player can simply press the "1000" button ten times to reach the desired betting amount. Note, the bet-amount buttons 1520 shown are illustrative and non-exclusive. Buttons designated for other amounts, e.g., "1", "5", "10", "100", "100,000", "1,000,000" can be readily added to the screen. The credit window 530 shows the remaining balance of a player's credit. The player may insert bills or chips into or transfer money from a credit card account and/or a bank account to the machine to add up the credit amount from time to time. If the player desires to stop playing the baccarat game and to cash out, he may ask the operator to authorize a cash-out procedure, and then obtain the remaining balance. Once results of a game are confirmed, the losing bet shown in the bet option buttons (1510) in the center of lower screen will disappear while the winning bet in the bet option buttons (1510) in the lower screen will flash with the total amount won.

Figure 13C:
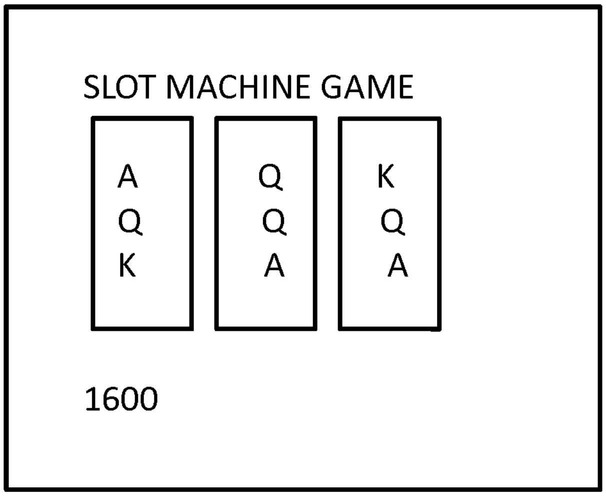

Still referring to FIG. 13B, the lower screen portion 1500 further includes language selection button (1540), which can switch the operation language of the baccarat game between, e.g., English, Portuguese, Italian, French, Spanish, Russian, German, Arabic, Japanese, and Korean, etc, Rule selection button (1550), which prompts the display of rules for live baccarat and Paradise Jackpot, Cancel button (1560), which allows the bettor to cancel all bets made before the cards are dealt, Operator button (1570), which allows the bettor to call for assistance from the casino staff when there is machine failure or the bettor wishes to exit from the game, and Results Bars (1580, 1590) which display the results for previous live baccarat games. The results bars (1580, 1590) shows history for each table providing a results history display. For example, results bar 1580 shows the past game results for approximately 30 games played at a single table. By way of example, for the game of Baccarat the results history may be shown by way of a display results bar that shows player, banker and tie results as well as player or banker pairs natural results—all shown with an explanation of the symbols and running tally of results. Results bar 1590 area shows the results history for three (3) tables (1592, 1594, 1596). The results bar 1580 shows the results for another table, which may be for the table that is currently being played, which is why it appears larger and has a larger number results from past games played. The player may switch between games by touching the results bar that corresponds to the table they want to play at. This allows for significantly reduced down time. During any period of inactivity (for example during dealing, or waiting for bets to be placed at one table) the player can switch to another table quickly and easily and virtually play at that table. This increases the play for the player, adding to a sense of excitement. For the casinos, it is also highly profitable. Table games require dealers and the number of places are limited by gaming regulations and the physical space around a table. The gaming system of the present invention allows more players to play at the tables, as they are not physically at the table. There may be another second additional portion of the screen in the main cabinet for playing a casino slot machine game 1600, as shown in FIG. 13C. It should be understood FIGS. 13A, 13B and 13C are each separate portions of a screen. They may be within one screen as portions within one screen, or within separate screens viewable to a player (for example as shown in FIG. 5).

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

I claim:

1. A gaming system comprising a main cabinet in a casino and a computer server, the system comprising:

a mechanism in a main cabinet in a casino for selecting and playing, by a player, one or more live casino game(s) from a plurality of live casino games being played at a plurality of tables spaced away from said main cabinet;

a switching mechanism in said main cabinet in a casino for selecting and playing one or more casino slot machine game(s) by said player, at least one first portion of a first screen in said main cabinet in a casino for displaying the one or more live-casino game(s) to said player wherein the one or more live casino game(s) is a game offered in at least one casino resort, wherein a results history for each table is displayed in said at least one first portion of a first screen to provide a results history display, at least one or more second additional portion of a screen in said main cabinet in a casino for displaying at least one casino slot machine game(s) to said player wherein said casino slot machine game(s) is offered in at least one casino resort, wherein said screen may be the same as or different than said first screen, wherein the switching mechanism for selecting and playing one or more casino slot machine game(s) is adapted to allow the player to switch between the plurality of live casino games and at least one casino slot machine games according to at least the results history display for each table.

2. The gaming system of claim 1, wherein the computer server is a stand alone server or included in the mechanism for selecting and playing one or more live casino game(s).

3. The gaming system of claim 1, wherein the one or more live casino game(s) is a live baccarat game, a felt-table game, poker game, Sic Bo game, a Roulette game, a Fish-Prawn-Crab game, or a Wheel of Fortune game.

4. The gaming system of claim 1, wherein the casino slot machine game is a video server based game.

5. The gaming system of claim 4, wherein the casino slot machine game is a video server based slot machine game.

6. The gaming system of claim 1, wherein the switching mechanism for selecting and playing one or more live casino game(s) comprises a touch screen.

7. The gaming system of claim 1, wherein the switching mechanism for selecting and playing one or more casino slot machine game(s) comprises a touch screen.

8. The gaming system of claim 1, wherein the first portion of a first screen(s) and at least one or more second additional portion of a screen for displaying the one or more live-casino game(s) comprises a upper screen and a lower screen.

9. The gaming system of claim 8, wherein the upper screen and the lower screen are connected through a connection mechanism.

10. The gaming system of claim 9, wherein the connection mechanism comprises a hinge(s) or an arm(s).

11. The gaming system of claim 9, wherein the connection mechanism comprises at least one hinge, allowing the at least one screen for displaying the casino slot machine game to be folded to the main cabinet to cover up the upper screen.

12. The gaming system of claim 9, wherein the connection mechanism comprises a metallic arm(s).

13. The gaming system of claim 11, wherein the at least one screen for displaying the casino slot machine game(s) is either connected to and integratedly extended from the upper screen or the lower screen.

14. The gaming system of claim 1, wherein the one or more live casino game(s) are connected to the computer server by a wired or wireless network.

15. The gaming system of claim 1, wherein the one or more live casino game(s) are offered in a single casino resort.

16. The gaming system of claim 1, wherein the one or more live casino game(s) are offered in multiple casino resorts.

17. The gaming system of claim 14, wherein the at least one screen for displaying the casino slot machine game(s) is folded or fixed.

* * * * *